US010034023B1

(12) United States Patent
Paniconi

(10) Patent No.: US 10,034,023 B1
(45) Date of Patent: Jul. 24, 2018

(54) EXTENDED PROTECTION OF DIGITAL VIDEO STREAMS

(75) Inventor: Marco Paniconi, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 1723 days.

(21) Appl. No.: 13/561,525

(22) Filed: Jul. 30, 2012

(51) Int. Cl.
*H04N 19/65* (2014.01)

(52) U.S. Cl.
CPC .................................... *H04N 19/65* (2014.11)

(58) Field of Classification Search
None
See application file for complete search history.

(56) References Cited

U.S. PATENT DOCUMENTS 5,731,840 A 3/1998 Kikuchi et al.
6,108,383 A 8/2000 Miller et al.
6,266,337 B1 7/2001 Marco
6,421,387 B1 7/2002 Rhee
6,483,928 B1 11/2002 Bagni et al.
6,556,588 B2 4/2003 Wan et al.
6,587,985 B1 7/2003 Fukushima et al.
6,681,362 B1 1/2004 Abbott et al.
6,684,354 B2 1/2004 Fukushima et al.
6,732,313 B2 5/2004 Fukushima et al.
6,741,569 B1 5/2004 Clark
6,865,178 B1 3/2005 Euget et al.
6,918,077 B2 7/2005 Fukushima et al.
6,952,450 B2 10/2005 Cohen
7,124,333 B2 10/2006 Fukushima et al.
7,180,896 B1 2/2007 Okumura
7,263,644 B2 8/2007 Park et al.
7,356,750 B2 4/2008 Fukushima et al.
7,372,834 B2 5/2008 Kim et al.
7,376,880 B2 5/2008 Ichiki et al.
7,447,235 B2 11/2008 Luby et al.
(Continued)

OTHER PUBLICATIONS

Stanic et al. "Error Probability in Redundant Packet Sending over IP Network", Radioengineering, vol. 20, No. 4, Dec. 2011.*
(Continued)

*Primary Examiner* — Tung Vo
*Assistant Examiner* — Joseph Becker
(74) *Attorney, Agent, or Firm* — Young Basile Hanlon & MacFarlane, P.C.

(57) ABSTRACT

Disclosed herein are implementations of systems, methods, and apparatuses for extended protection of digital video streams. The disclosed implementations include a method for transmitting a video stream over a network with forward error correction protection including encoding a current frame of the plurality of frames, producing a plurality of data packets from the encoded frame, generating a plurality of protection packets including data usable for restoring one or more lost data packets of the plurality of data packets, wherein at least one of the plurality of protection packets also includes data usable for restoring a lost protection packet of the protection packets, and wherein a protection packet of the plurality of protection packets includes a packet mask that indicates which of the plurality of data packets and plurality of protection packets are protected by the protection packet, and transmitting the data packets and the protection packets over the network.

22 Claims, 9 Drawing Sheets

| | 704a | 704b | 704c | 704d | 704e | 704f | 704g | 704h |
|---|---|---|---|---|---|---|---|---|
| (5,3) | $S_1$ | $S_2$ | $S_3$ | $S_4$ | $S_5$ | $F_1$ | $F_2$ | $F_3$ |
| 702a — $F_1$ | 1 | 0 | 1 | 1 | 0 | 0 | 1 | 0 |
| 702b — $F_2$ | 1 | 1 | 0 | 0 | 1 | 0 | 0 | 1 |
| 702c — $F_3$ | 0 | 1 | 0 | 0 | 1 | 0 | 0 | 0 |
| | | | | | | | | |

(56) References Cited

U.S. PATENT DOCUMENTS

| | | | |
|---|---|---|---|
| 7,447,969 | B2 | 11/2008 | Park et al. |
| 7,471,724 | B2 | 12/2008 | Lee |
| 7,484,157 | B2 | 1/2009 | Park et al. |
| 7,502,818 | B2 | 3/2009 | Kohno et al. |
| 7,577,898 | B2 | 8/2009 | Costa et al. |
| 7,636,298 | B2 | 12/2009 | Miura et al. |
| 7,680,076 | B2 | 3/2010 | Michel et al. |
| 7,710,973 | B2 | 5/2010 | Rumbaugh et al. |
| 7,756,127 | B2 | 7/2010 | Nagai et al. |
| 7,823,039 | B2 | 10/2010 | Park et al. |
| 7,886,071 | B2 | 2/2011 | Tomita |
| 7,974,243 | B2 | 7/2011 | Nagata et al. |
| 8,060,651 | B2 | 11/2011 | Deshpande et al. |
| 8,085,767 | B2 | 12/2011 | Lussier et al. |
| 8,139,642 | B2 | 3/2012 | Vilei et al. |
| 8,233,539 | B2 | 7/2012 | Kwon |
| 8,438,451 | B2 | 5/2013 | Lee et al. |
| 8,661,323 | B2 | 2/2014 | Paniconi |
| 8,666,186 | B1 | 3/2014 | Rasche |
| 8,726,136 | B2 | 5/2014 | Fang |
| 8,856,624 | B1 | 10/2014 | Paniconi |
| 9,185,429 | B1 | 11/2015 | Gu et al. |
| 2002/0035714 | A1 | 3/2002 | Kikuchi et al. |
| 2002/0085637 | A1 | 7/2002 | Henning |
| 2002/0157058 | A1 | 10/2002 | Ariel et al. |
| 2003/0012287 | A1 | 1/2003 | Katsavounidis et al. |
| 2003/0098992 | A1 | 5/2003 | Park et al. |
| 2003/0226094 | A1 | 12/2003 | Fukushima et al. |
| 2003/0229822 | A1 | 12/2003 | Kim et al. |
| 2004/0165585 | A1 | 8/2004 | Imura et al. |
| 2004/0196860 | A1 | 10/2004 | Gao et al. |
| 2005/0024487 | A1 | 2/2005 | Chen |
| 2005/0076272 | A1 | 4/2005 | Delmas et al. |
| 2005/0154965 | A1* | 7/2005 | Ichiki et al. .................. 714/776 |
| 2005/0180415 | A1 | 8/2005 | Cheung et al. |
| 2006/0005106 | A1 | 1/2006 | Lane et al. |
| 2006/0109805 | A1 | 5/2006 | Malamal Vadakital et al. |
| 2006/0146940 | A1 | 7/2006 | Gomila et al. |
| 2006/0150055 | A1 | 7/2006 | Quinard et al. |
| 2006/0188024 | A1 | 8/2006 | Suzuki et al. |
| 2006/0248563 | A1 | 11/2006 | Lee et al. |
| 2006/0251011 | A1 | 11/2006 | Ramakrishnan et al. |
| 2006/0291475 | A1 | 12/2006 | Cohen |
| 2007/0168824 | A1 | 7/2007 | Fukushima et al. |
| 2007/0250754 | A1 | 10/2007 | Costa et al. |
| 2007/0296822 | A1 | 12/2007 | Lan et al. |
| 2008/0089414 | A1* | 4/2008 | Wang et al. ............. 375/240.13 |
| 2008/0101403 | A1 | 5/2008 | Michel et al. |
| 2008/0109707 | A1 | 5/2008 | Dell et al. |
| 2008/0134005 | A1 | 6/2008 | Izzat et al. |
| 2008/0209300 | A1 | 8/2008 | Fukushima et al. |
| 2008/0225944 | A1 | 9/2008 | Pore et al. |
| 2008/0250294 | A1 | 10/2008 | Ngo et al. |
| 2009/0006927 | A1 | 1/2009 | Sayadi et al. |
| 2009/0022157 | A1 | 1/2009 | Rumbaugh et al. |
| 2009/0059917 | A1 | 3/2009 | Lussier et al. |
| 2009/0080510 | A1 | 3/2009 | Wiegand et al. |
| 2009/0103635 | A1 | 4/2009 | Pahalawatta |
| 2009/0138784 | A1 | 5/2009 | Tamura et al. |
| 2009/0249158 | A1 | 10/2009 | Noh et al. |
| 2009/0276686 | A1 | 11/2009 | Liu et al. |
| 2009/0303176 | A1 | 12/2009 | Chen et al. |
| 2009/0327842 | A1* | 12/2009 | Liu et al. ...................... 714/776 |
| 2010/0080297 | A1 | 4/2010 | Wang et al. |
| 2010/0085963 | A1* | 4/2010 | Bekiares et al. .............. 370/389 |
| 2010/0122127 | A1 | 5/2010 | Oliva et al. |
| 2010/0153828 | A1 | 6/2010 | De Lind Van Wijngaarden et al. |
| 2010/0171882 | A1 | 7/2010 | Cho et al. |
| 2010/0202414 | A1 | 8/2010 | Malladi et al. |
| 2010/0306618 | A1 | 12/2010 | Kim et al. |
| 2011/0194605 | A1 | 8/2011 | Amon et al. |
| 2012/0147140 | A1 | 6/2012 | Itakura et al. |
| 2012/0290900 | A1 | 11/2012 | Paniconi |
| 2013/0031441 | A1 | 1/2013 | Ngo et al. |
| 2013/0044183 | A1 | 2/2013 | Jeon et al. |

OTHER PUBLICATIONS

Han et al. RPT: Re-architecting Loss Protection for Content-Aware Networks.*

Friedman, et al., "RTP: Control Protocol Extended Reports (RTPC XR)," Network Working Group RFC 3611 (The Internet Society 2003) (52 pp).

U.S. Appl. No. 13/103,565, filed May 9, 2011 titled "Method and Apparatus for Generating Packet Mask", Inventor: Paniconi.

U.S. Appl. No. 13/305,021, filed Nov. 28, 2011 titled "Method and Apparatus for Requesting Retransmission of Missing Packets in Data Communications", Inventors: Shemer et al.

U.S. Appl. No. 13/305,175, filed Nov. 28, 2011 titled "Method and Apparatus for Decoding Packetized Data", Inventors: Paniconi et al.

U.S. Appl. No. 13/421,031, filed Mar. 15, 2012 titled "Adaptive Protection Modes for Packet Loss in Digital Video Streams", Inventors: Paniconi et al.

Roca, Vincent, et al., Design and Evaluation of a Low Density Generator Matrix (LDGM) Large Block FEC Codec, INRIA Rhone-Alpes, Planete project, France, Date Unknown, (12 pp).

Li, A., "RTP Payload Format for Generic Forward Error Correction", Network Working Group, Standards Track, Dec. 2007, (45 pp).

Wikipedia, the free encyclopedia, "Low-density parity-check code", http://en.wikipedia.org/wiki/Low-density_parity-check_code, Jul. 30, 2012 (5 pp).

Bankoski et al. "Technical Overview of VP8, an Open Source Video Codec for the Web". Dated Jul. 11, 2011.

Bankoski et al. "VP8 Data Format and Decoding Guide" Independent Submission. FC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Overview; VP7 Data Format and Decoder. Version 1.5. On2 Technologies, Inc. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

(56) References Cited

OTHER PUBLICATIONS

VP8 Data Format and Decoding Guide. WebM Project. Google On2. Dated: Dec. 1, 2010.
Mozilla, "Introduction to Video Coding Part 1: Transform Coding", Video Compression Overview, Mar. 2012, 171 pp.
Sony. "PlayStation® Move Me", published online at [http//us.playstation.com/ps3/playstation-move/move-me/], retrieved Mar. 14, 2012, 2 pages.
Sony. "PlayStation® Move Motion Controller", published online at [http//us.playstation.com/ps3/playstation-move/], retrieved Mar. 14, 2012, 4 pages.
Microsoft. "Xbox 360 + Kinect", published online at [http://www.xbox.com/en=US/kinect], retrieved Mar. 14, 2012. 2 pages.
Frossard, Pascal; "Joint Source/FEC Rate Selection for Quality-Optimal MPEG-2 Video Delivery", IEEE Transactions on Image Processing, vol. 10, No. 12, (Dec. 2001) pp. 1815-1825.
International Search Report and Written Opinion for International Application No. PCT/US2011/051818 dated Nov. 21, 2011 (16 pages).
Korhonen, Jari; Frossard, Pascal; "Flexible forward error correction codes with application to partial media data recovery", Signal Processing: Image Communication vol. 24, No. 3 (Mar. 2009) pp. 229-242.
Liang, Y.J.; Apostolopoulos, J.G.; Girod, B., "Analysis of packet loss for compressed video: does burst-length matter?," Acoustics, Speech and Signal Processing, 2003. Proceedings. (ICASSP '03). 2003 IEEE International conference on, vol. 5, no., pp. V, 684-7 vol. 5, Apr. 6-10, 2003.
Yoo, S. J.B., "Optical Packet and burst Switching Technologies for the Future Photonic Internet," Lightwave Technology, Journal of, vol. 24, No. 12, pp. 4468, 4492, Dec. 2006.
Yu, Xunqi, et al; "The Accuracy of Markov Chain Models in Predicting Packet-Loss Statistics for a Single Multiplexer", IEEE Transaactions on Information Theory, vol. 54, No. 1 (Jan. 2008) pp. 489-501.

* cited by examiner

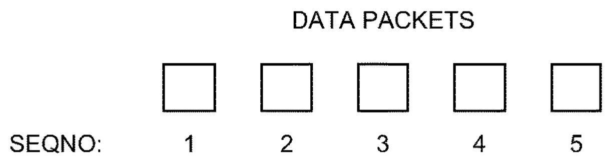
FIG. 4
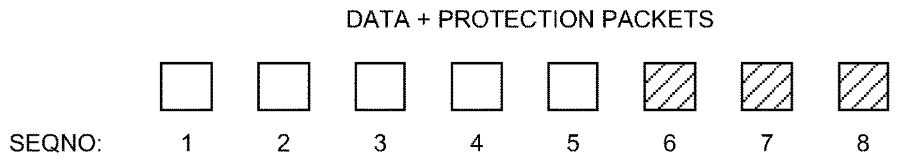
FIG. 5
600
| | (5,3) | $S_1$ (604a) | $S_2$ (604b) | $S_3$ (604c) | $S_4$ (604d) | $S_5$ (604e) |
|---|---|---|---|---|---|---|
| 602a | $F_1$ | 1 | 0 | 1 | 1 | 0 |
| 602b | $F_2$ | 1 | 1 | 0 | 0 | 1 |
| 602c | $F_3$ | 0 | 1 | 1 | 0 | 0 |
FIG. 6

| | | 704a | 704b | 704c | 704d | 704e | 704f | 704g | 704h |
|---|---|---|---|---|---|---|---|---|---|
| | (5,3) | $S_1$ | $S_2$ | $S_3$ | $S_4$ | $S_5$ | $F_1$ | $F_2$ | $F_3$ |
| 702a | $F_1$ | 1 | 0 | 1 | 1 | 0 | 0 | 1 | 0 |
| 702b | $F_2$ | 1 | 1 | 0 | 0 | 1 | 0 | 0 | 1 |
| 702c | $F_3$ | 0 | 1 | 0 | 0 | 1 | 0 | 0 | 0 |

*FIG. 7*

| | | 804a | 804b | 804c | 804d | 804e |
|---|---|---|---|---|---|---|
| | (5,3) | $S_1$ | $S_2$ | $S_3$ | $S_4$ | $S_5$ |
| 802a | $F_1$ | 1 | 1 | 1 | 1 | 1 |
| 802b | $F_2$ | 1 | 0 | 0 | 1 | 1 |
| 802c | $F_3$ | 0 | 1 | 0 | 0 | 1 |

| (4,4) | $S_1$ | $S_2$ | $S_3$ | $S_4$ | $F_1$ | $F_2$ | $F_3$ | $F_4$ | |
|---|---|---|---|---|---|---|---|---|---|
| $F_1$ | 1 | 0 | 0 | 0 | 0 | 0 | 0 | 0 | |
| $F_2$ | 1 | 1 | 0 | 0 | 0 | 0 | 0 | 0 | |
| $F_3$ | 0 | 1 | 1 | 0 | 0 | 0 | 0 | 1 | |
| $F_4$ | 0 | 0 | 1 | 1 | 0 | 0 | 0 | 0 | |

*FIG. 12*

EXTENDED PROTECTION OF DIGITAL VIDEO STREAMS

TECHNICAL FIELD

The present invention relates in general to transmission of digital video streams.

BACKGROUND

Digital video streams typically represent video using a sequence of frames or still images. An increasing number of applications today make use of digital video stream encoding for purposes other than traditional moving pictures, movies, or video clips. As technology is evolving, users have higher expectations for video quality and expect high resolution video with smooth playback.

Applications can transmit encoded video streams using networks that can lose portions of the transmitted video stream due to transmission errors. "Noisy" or unreliable networks can lose or corrupt data included in the video stream and thereby cause errors that can affect the video quality of the displayed video stream. Various approaches have been proposed to protect video streams from data loss or corruption caused by unreliable networks. One approach, for example forward error correction (FEC), can protect video streams by adding additional data to the video stream to sometimes permit recovery of missing or corrupt data without requiring re-transmission.

SUMMARY

Disclosed herein are implementations of systems, methods, and apparatuses for extended protection of digital video streams.

An aspect of the disclosed implementations is a method for transmitting a video stream over a network with forward error correction protection, the video stream including a plurality of frames. The method includes encoding a current frame of the plurality of frames, producing a plurality of data packets from the encoded frame, generating a plurality of protection packets including data usable for restoring one or more lost data packets of the plurality of data packets, wherein at least one of the plurality of protection packets also includes data usable for restoring a lost protection packet of the plurality of protection packets, and wherein a protection packet of the plurality of protection packets includes a packet mask that indicates which of the plurality of data packets and plurality of protection packets are protected by the protection packet, and transmitting the data packets and the protection packets over the network.

An aspect of the disclosed implementations is a method for receiving a video stream from a network, the video stream including a plurality of frames. The method includes receiving a plurality of data packets and protection packets from the network, wherein the data packets include portions of an encoded unit of the video stream, and wherein a protection packet of the plurality of protection packets includes a packet mask that indicates which of the plurality of data packets and plurality of protection packets are protected by the protection packet, determining that a lost data packet of the encoded unit has not been received from the network, determining that a lost protection packet associated with the encoded unit has not been received from the network, recovering the lost protection packet, and recovering the lost data packet using the recovered lost protection packet.

An aspect of the disclosed implementations is an apparatus for transmitting a video stream over a network with forward error correction protection, the video stream including a plurality of frames. The apparatus includes a memory and a processor configured to execute instructions stored in the memory to: encode a current frame of the plurality of frames, produce a plurality of data packets from the encoded frame, generate a plurality of protection packets including data usable for restoring one or more lost data packets of the plurality of data packets, wherein at least one of the plurality of protection packets also includes data usable for restoring a lost protection packet of the plurality of protection packets, and wherein a protection packet of the plurality of protection packets includes a packet mask that indicates which of the plurality of data packets and plurality of protection packets are protected by the protection packet, and transmit the data packets and the protection packets over the network.

These and other aspects and implementations will be described in additional detail hereafter.

BRIEF DESCRIPTION OF THE DRAWINGS

The description herein makes reference to the accompanying drawings wherein like reference numerals refer to like parts throughout the several views, and wherein:

FIG. 4 is a diagram of data packets in accordance with an implementation of this disclosure;

FIG. 5 is a diagram of data and protection packets in accordance with an implementation of this disclosure;

FIG. 6 is an exemplary FEC generator matrix in accordance with an implementation of this disclosure;

FIG. 7 is an exemplary extended FEC generator matrix in accordance with an implementation of this disclosure;

FIG. 8 is an exemplary indirectly extended FEC generator matrix in accordance with an implementation of this disclosure;

FIG. 12 is an exemplary extended FEC generator matrix used to illustrate the recovery of data packets based on the recovery of a single protection packet.

DETAILED DESCRIPTION

Figure 1A:
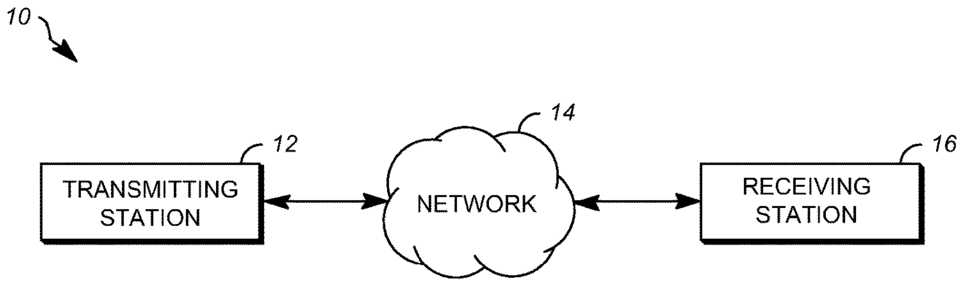
FIG. 1A is a schematic of a video transmission system.

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth and those that are noisy.

Aspects of disclosed implementations include ways to improve protection of video streams in the presence of signal noise or unreliability. Video streams can be divided into packets to facilitate transmission of the video stream. Noisy or unreliable mechanisms that transport video streams, such as networks, for instance, can cause packet loss. Packet loss can result from, among other causes, the network dropping the packet due to congestion. Aspects of disclosed embodiments use FEC at the packet level to generate protection packets for encoded video streams. A receiver can detect missing packets by for example, checking sequence numbers of packet headers or computing checksums for a packet. If a missing packet is discovered, received protection packets can be used to recover the missing packet.

Certain types of FEC protection include use of a generator matrix to generate protection packets. The rows of the generator matrix indicate how a particular protection packet is generated and can be referred to as packet masks. Each protection packet can include the packet mask from which it was created. The embedded protection mask can be used to enable FEC recovery in a low-complexity manner.

Aspects of disclosed implementations improve the use of packet masks to include protection of the protection packets themselves. Protection of the protection packets can be achieved by extending the packet mask to include the protection packets. Extending the packet mask allows for protection of protection packets while maintaining low complexity for FEC recovery. Protection of the protection packets can also be achieved by indirectly extending the packet mask, which includes protection of protection packets implicitly in the packet mask.

Aspects of disclosed implementations can utilize the extended packet masks to enable determinations for packet re-transmission in the event that lost packets cannot be recovered. For example, the extended packet mask can be used to determine that the re-transmission of a lost protection packet may enable more robust recovery than the re-transmission of a lost data packet.

Aspects of disclosed implementations can utilize various techniques for creating the packet masks used to create the protection packets. Values of maximum expected packet loss and consecutiveness of packet loss can be used to optimize creation of packet masks for certain expected conditions. Certain metrics, such as residual packet loss, complete recovery rate, variance of packet loss, or a combination thereof can be used to identify packet masks for use, either with or without using the values of maximum expected packet loss and consecutiveness of packet loss. The above described metrics can be selected for use based on the configuration of a receiver of the video stream, including whether or not the receiver is configured to decode the video stream with errors (e.g., with missing packets) or without errors (e.g., waiting until all data packets are received/recovered).

FIG. 1A is a schematic of a video transmission system 10. An exemplary transmitting station 12 can be, for example, a computer having an internal configuration of hardware such as that described in FIG. 1B. However, other suitable implementations of the transmitting station 12 are possible. For example, the processing of the transmitting station 12 can be distributed among multiple devices.

A network 14 connects the transmitting station 12 and a receiving station 16. Specifically, a video stream can be encoded in the transmitting station 12 and the encoded video stream can be decoded in the receiving station 16. The network 14 can, for example, be the Internet. The network 14 can also be a local area network (LAN), wide area network (WAN), virtual private network (VPN), or any other means of transferring the video stream from the transmitting station 12.

Figure 1B:
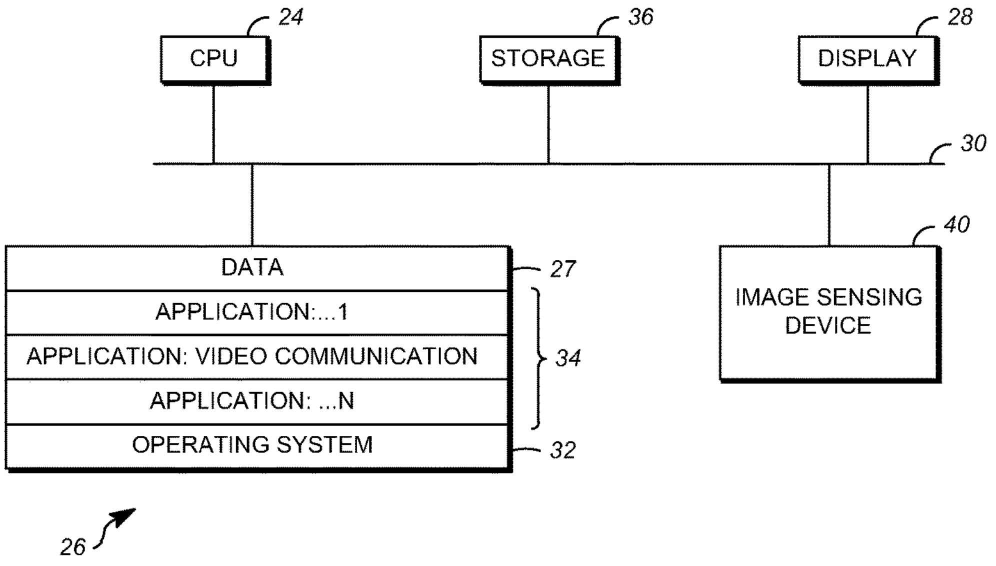
FIG. 1B is a block diagram of an example internal configuration of the transmitting station and the receiving station of FIG. 1A.

The receiving station 16, in one example, can be a computer having an internal configuration of hardware such as that described in FIG. 1B. Other suitable implementations of the receiving station 16 are possible. For example, the processing of the receiving station 16 can be distributed among multiple devices.

Other implementations of the video transmission system 10 are possible. In an implementation, additional components can be added to the encoder and decoder system 10. For example, a second receiving station can be added. In an implementation, components can be removed from the video transmission system 10. For example, the receiving station 16 and/or network 14 can be omitted, and the techniques and processes described herein (or a subset thereof) can be implemented using station 12.

FIG. 1B is a block diagram of an example internal configuration of transmitting station 12 and receiving station 16 of FIG. 1A. Each of stations 12, 16 can be in the form of a computing system including multiple computing devices, or in the form of a single computing device, for example, a mobile phone, a tablet computer, a laptop computer, a notebook computer, a desktop computer, and the like.

The CPU 24 in stations 12, 16 can be a conventional central processing unit. Alternatively, the CPU 24 can be any other type of device, or multiple devices, capable of manipulating or processing information now-existing or hereafter developed. Although the disclosed embodiments can be practiced with a single processor as shown, e.g. CPU 24, advantages in speed and efficiency can be achieved using more than one processor.

The memory 26 in stations 12, 16 can be a random access memory device (RAM). Any other suitable type of storage device can be used as the memory 26. The memory 26 can include code and data 27 that is accessed by the CPU 24 using a bus 30. The memory 26 can further include an operating system 32 and application programs 34, the application programs 34 including programs that permit the CPU 24 to perform the methods described here. For example, the application programs 34 can include applications 1 through N which further include a video communication application that can perform the methods described here. Stations 12, 16 can also include a secondary storage 36, which can, for example, be a memory card used with a mobile computing device. Because video communication can contain a significant amount of information, they can be stored in whole or in part in the secondary storage 36 and loaded into the memory 26 as needed for processing.

Stations 12, 16 can also include one or more output devices, such as display 28, which can be a touch sensitive display that combines a display with a touch sensitive element that is operable to sense touch inputs. The display 28 can be coupled to the CPU 24 via the bus 30. Other output devices that permit a user to program or otherwise use stations 12, 16 can be provided in addition to or as an alternative to the display 28. When the output device is or includes a display, the display can be implemented in various ways, including by a liquid crystal display (LCD) or a cathode-ray tube (CRT) or light emitting diode (LED) display, such as an OLED display.

Stations 12, 16 can also include or be in communication with an image-sensing device 38, for example a camera, or any other image-sensing device 38 now existing or hereafter developed. The image-sensing device 38 can be configured to receive images, for example, of the face of a device user while the device user is operating one of stations 12, 16.

Although FIG. 1B depicts the CPU 24 and the memory 26 of stations 12,16 as being integrated into a single unit, other configurations can be utilized. The operations of the CPU 24 can be distributed across multiple machines (each machine having one or more of processors) which can be coupled directly or across a local area or other network. The memory 26 can be distributed across multiple machines such as network-based memory or memory in multiple machines performing the operations of stations 12, 16. Although depicted here as a single bus, the bus 30 of stations 12, 16 can be composed of multiple buses. Further, the secondary storage 36 can be directly coupled to the other components of stations 12, 16 or can be accessed via a network and can comprise a single integrated unit such as a memory card or multiple units such as multiple memory cards. Stations 12, 16 can thus be implemented in a wide variety of configurations.

Figure 2:
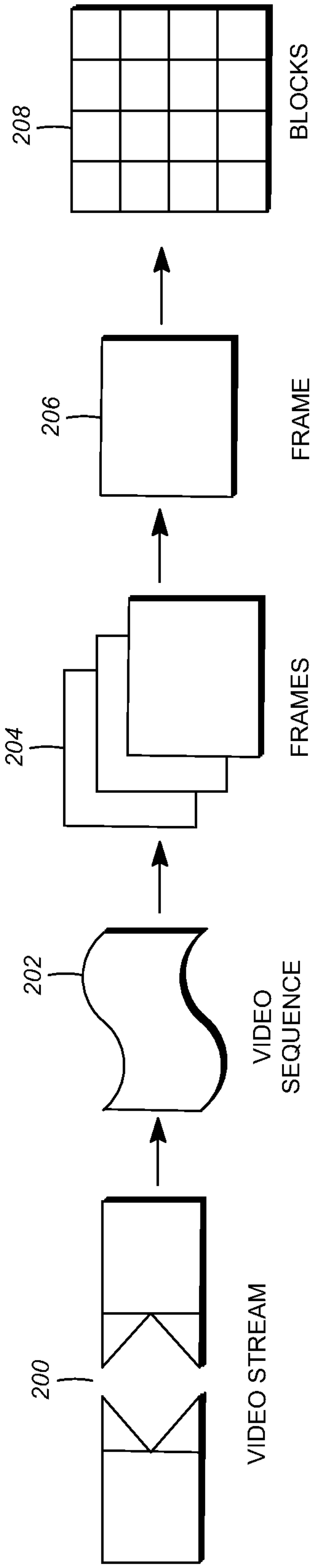
FIG. 2 is a diagram of a typical video stream to be encoded and/or decoded.

FIG. 2 is a diagram of a typical video stream 200 to be encoded and/or decoded. Video coding formats, such as VPx or H.264, provide a defined hierarchy of layers for a video stream. The video stream 200 includes a video sequence 202. At the next level, the video sequence 202 includes a number of adjacent frames 204. While three frames are depicted in adjacent frames 204, the video sequence 202 can include any number of adjacent frames. The adjacent frames 204 can then be further subdivided into a single frame 206. At the next level, the single frame 206 can be divided into a series of blocks 208, which can contain data corresponding to, for example, a 16×16 pixel group of displayed pixels in the frame 206. Each block can contain luminance and chrominance data for the corresponding pixels. The blocks 208 can also be of any other suitable size such as 16×8 pixel groups or 8×16 pixel groups. The terms block and macroblock can be used interchangeably herein.

Figure 3:
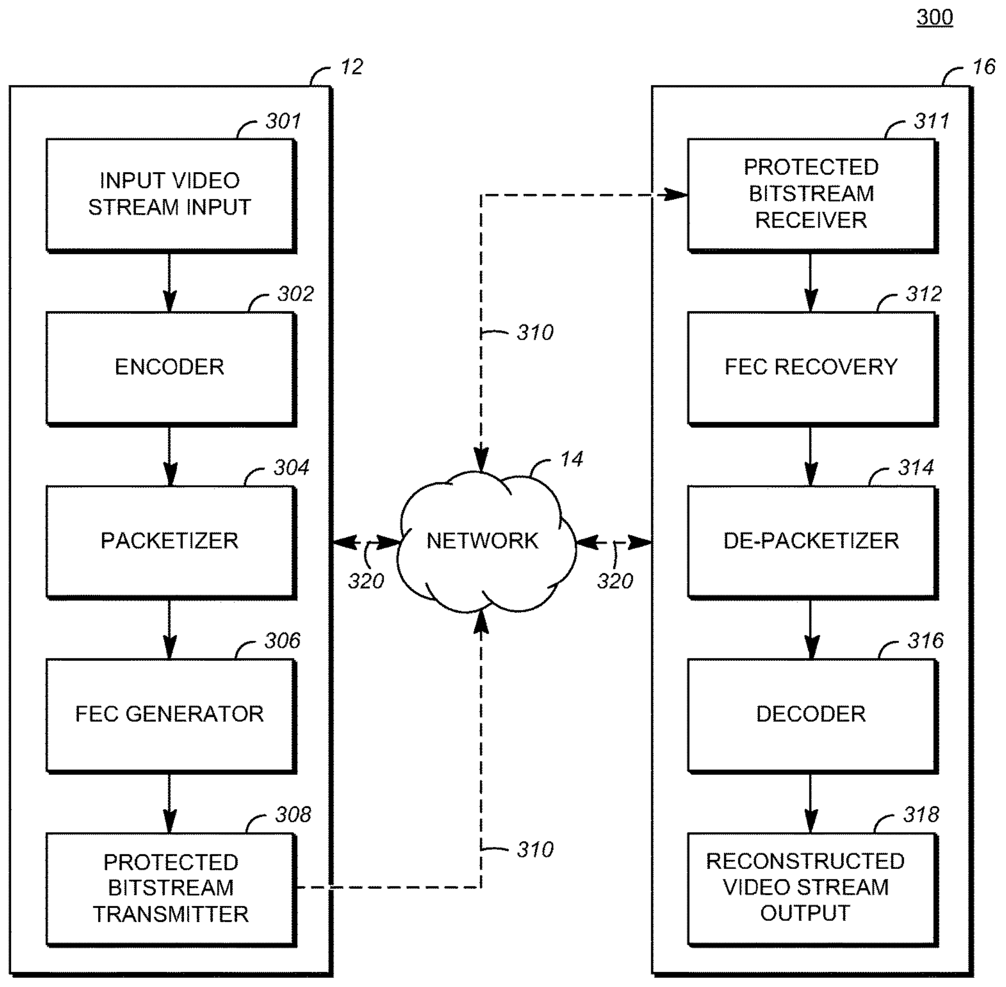
FIG. 3 is a block diagram of a video transmission implementation in accordance with this disclosure.

FIG. 3 is a block diagram of video transmission implementation 300 in accordance with this disclosure. Video transmission implementation 300 includes input video stream input stage 301, encoder stage 302, packetizer stage 304, FEC generator stage 306, protected bitstream transmitter stage 308, protected bitstream receiver stage 311, FEC recovery stage 312, de-packetizer stage 314, decoder stage 316, reconstructed video stream output stage 318, or a combination thereof. Video transmission implementation 300 is shown as being implemented using transmission station 12, network 14, and receiving station 16.

At input video stream stage 301, a video stream for encoding and transmission can be captured, received, identified, or otherwise input. For example, a video stream can be captured using an image-sensing device (e.g., image-sensing device 40). The video stream can be of any suitable format, such as video stream 200 as described with respect to FIG. 2.

The video stream or a portion thereof is passed to encoder stage 302. Encoder stage 302 can encode the video stream using one or more encoding techniques. For example, the video stream can be encoded using formats such as VPx, H.264, MPEG, MJPEG, and/or others. Encoder stage 302 can include use of encoding techniques such as intra/inter prediction, frequency transform (e.g., discrete cosine transform (DCT)), quantization, entropy coding, reconstruction of encoded data for prediction, or a combination thereof. Other encoding techniques can be used in addition to and/or in lieu of those described. Encoder stage 302 can generate an encoded video stream or portion thereof using these encoding techniques.

Encoded video data from stage 302 is passed to packetizer stage 304. Packetizer stage 304 can produce data packets capable of being transmitted over a network (e.g., network 14). For example, a network may have a maximum size of data that it can transmit per transmission unit (e.g., packet). The maximum size per packet can be referred to as a maximum transmission unit (MTU) and can be, for example, 1400 bytes. An encoding of a frame of a video stream typically will require more than 1400 bytes, and thus a frame of video data will generally be packetized into multiple data packets.

The data packets can then be passed to FEC generator stage 306. FEC generator stage 306 can generate protection packets for the data packets. The data packets can include data for part of a video frame, for a full video frame, or for multiple video frames. The protection packets can be generated using, for example, a XOR channel code, such one described within Request For Comments (RFC) 5109 (Li et al., RTP Payload Format for Generic FEC, December 2007). Accordingly, a generator matrix can be utilized to generate protection packets by specifying a linear combination of data packets for at least some of the protection packets. In addition, in accordance with an implementation of this disclosure, a generator matrix can be extended to generate protection packets by specifying a linear combination of data packets and protection packets for at least some of the protection packets. Protection packets can be generated, for example, by an algebraic operation of byte-wise XOR across specified linear combinations of packets.

In an implementation, a generator matrix can include rows and columns of bits, wherein each row represents a protection packet and each column represents a packet that could possibly be protected (e.g., data packets and protection packets in an extended generator matrix). The generator matrix can be used by the FEC encoder to generate the FEC packets. The bits of each row of the generator matrix can be referred to as the packet mask for its associated protection packet. The packet mask indicates which packets are protected by its associated protection packet (e.g., in an implementation, protected packets are denoted by a “1” and unprotected packets are denoted by a “0”). The packet mask can be included in its associated protection packet and can be used, along with a packet id (e.g., reference number or base sequence number) to identify protected packets and enable recovery of those protected packets by a receiver (e.g., by FEC recovery stage 312).

Once protection packets are generated, the data packets and protection packets are passed to protected bitstream transmitter 308. Combined, the data packets and protection packets constitute the protected bitstream and can be transmitted in via transmission channel 310 and/or network 14 to protected bitstream receiver 311. The data packets and protection packets can be transmitted in any order. For example, data packets can be transmitted followed by their protection packets. In another example, data packets and their protection packets can be transmitted in an interleaved fashion.

Once received by protected bitstream receiver 311, received data and protection packets can be forwarded to FEC recovery stage 312. FEC recovery stage 312 can, for example, determine whether packets of the protected bitstream have not been received (e.g., determine whether there are any lost packets). Lost packets can be identified, for example, by using sequence numbers and/or time-stamps included in the data packets and protection packets.

FEC recovery stage 312 can include recovering a lost packet using a received protection packet and other received packets. For example, stage 312 can check to see if the received protection packet has a packet mask that includes an indication of the lost packet, check to see if all other packets indicated in the packet mask have been received and/or recovered, and if both checks pass, recover the lost packet. In an implementation using an XOR channel code, the lost packet can be recovered by performing a byte-wise XOR on the remaining packets indicated in the packet mask and the protection packet.

FEC recovery stage 312 can include requesting a retransmission of a lost packet, for example, in an instance where the lost packet cannot be recovered using the received packets. Requesting a retransmission of a lost packet can include sending a negative acknowledgement (NACK) to the transmitter, for example via transmission channel 320 and/or network 14. Use of both FEC and NACK techniques can be referred to as hybrid NACK/FEC.

FEC recovery stage 312 (and/or other stages) can be configured to (1) permit decoding of a video stream that is missing packets or (2) require that there are no missing packets as a prerequisite to decoding. In the first case, lost packets that are not recovered using FEC may or may not be recovered by NACK retransmission. In the second case, lost packets that cannot be recovered by FEC must be recovered by NACK retransmission (or a combination of NACK retransmission and FEC recovery). Various metrics (such as those described infra) can be used for the selection of the FEC packet masks, to reduce the reliance on NACK retransmission requests (i.e., to reduce delay). In an implementation, the extended packet mask can be used to determine for which of the lost packets that a NACK retransmission request should be sent for hybrid NACK/FEC.

Once FEC recovery stage 312 is complete (either with or without missing packets, depending on its configuration), the received and recovered data packets are forwarded to de-packetizer 314. De-packetizer 314 can extract the data included in the data packets and incorporate that data into a bitstream equivalent to the encoded video stream produced by encoder 302. However, in certain situations, there may be errors in the bitstream (e.g., if there are missing packets). The bitstream can then be forwarded to decoder stage 316.

Decoder stage 316 can decode the bitstream (e.g., encoded video stream) using decoding techniques such as entropy decoding, dequantization, inverse frequency transform (e.g., inverse DCT), inter/intra prediction, reconstruction, loop filtering, or a combination thereof. Other decoding techniques can be used in addition to and/or in lieu of those described. For example, error concealment techniques can be employed in the event that portions of the bitstream are missing. The resulting decoded video stream can be passed to reconstructed video stream output stage 318. Reconstructed video stream output stage 318 can utilize the output video stream, for example, by rendering the video stream to a display device or by storing the output video stream to a storage device.

Other video transmission system implementations of the described video transmission implementation 300 are possible, including those that add, remove, alter, and/or rearrange the stages described above. For example, in an implementation, FEC recovery stage 312 can be subdivided into multiple stages for FEC recovery, NACK retransmission request generation, identifying packets for retransmission requests, etcetera.

Additional aspects of implementations of FEC generation and recovery (e.g., with respect to FEC generation stage 304 and/or FEC recovery stage 312) will now be described. As described above, protection packets can be generated using an XOR channel code. A desirable feature of the XOR FEC codes is its low encoding and decoding complexity (as opposed to other FEC codes such as Reed Solomon). In particular, to recover a lost packet the FEC recovery stage can simply check to see whether the lost packet is included in the packet mask of a received protection packet, check to see that all other packets included in the packet mask have been received and/or recovered, and if so, XOR the remaining packets included in the packet mask to recover the missing packet.

This simple decoding is assisted by the generator matrix having low overlap/linearly independent rows. The XOR code in this case falls into the class of LDGM (low density generator matrix) codes. A wider class of XOR codes exist, LDPC (low density parity check) codes, of which LDGM is a subset. LDPC codes can include some level of protection of the protection packets. For LDPC codes, two matrices are specified, the parity check matrix (needed by the decoder to recover missing packets) and the generator matrix (needed by the encoder to generate FEC packets). The generator matrix of a LDPC code can be created by solving a set of linear equations based on the parity check matrix, increasing complexity. One aspect of the disclosed techniques is the extension of the packet mask structure of LDGM to capture the effects of protecting FEC packets, while maintaining the low decoding complexity of LDGM and, for example, maintaining the same signaling and header structure described in RFC 5109.

Generation of protection packets using FEC can be characterized by two numbers k and m, where k is the number of video stream data packets used in the FEC code, and m is the number of protection (FEC) packets for every k data packets. The protection factor PF or overhead is given by:

$$PF=m/(k+m) \quad \text{[Equation 1]}$$

The number of data (source) packets k can be the number of packets of a single video frame or can be the number of packets over less than one frame or multiple frames.

To illustrate, FIG. 4 is a diagram of data packets and FIG. 5 is a diagram of data and protection packets in accordance with an implementation of this disclosure. FIG. 4 illustrates 5 data packets having sequence numbers 1 through 5. The number of data packets in this case can be selected as the value for k. FIG. 5 illustrates 5 data packets having sequence numbers 1 through 5 and 3 protection packets having sequence numbers 6 through 8. The number of protection packets in this case can be determined by the value of m (in this case, m=3). While the data and protection packets are shown sequentially based on the order in which they were packetized and generated, in alternative implementations, they may be re-ordered into different orders (e.g., via an interleaving process) and may have different sequence numbers based on their re-ordering.

To further illustrate generation of protection packets using FEC, FIG. 6 is an exemplary FEC generator matrix 600 in accordance with an implementation of this disclosure. The XOR code can be characterized by a generator matrix, which is of size (k,m), also called an FEC matrix M. FIG. 6 depicts a generator matrix 600 having a size (5,3). The rows of the generator matrix are also referred to below as packet masks for the FEC code (e.g., rows 602_a-c_). Each column of the generator matrix corresponds to one of k source data packets (e.g., columns 604_a-e_). Each row 602 of matrix 600 specifies the linear combination of the data packets used to generate an protection packet, where a "1" selects the data packet for protection by the protection packet and a "0" does not select the data packet for protection. The algebraic operation is applied over the data packets by a byte-wise XOR function. The data packets used for a protection packet j is obtained from the j'th row of matrix 600 and is denoted by the set $P_j$ (the packet mask of FEC packet j).

Each FEC packet can include its associated packet mask in its header, and can also include the sequence number (base sequence number) of the first packet of the group of k source packets. This information can be used by the receiver/decoder to perform recovery (the bits in the packet mask and the offset via the base sequence number are used to point to the actual packets needed for recovery). The FEC header may be defined as in, for example, the RFC 5109 standard. The contents of generator matrix (M) can be generated in a variety of different ways that can vary by implementation. The determination of the code parameters (k, m) can be based on the content of the video and the state of the network (available bandwidth, packet loss, etc.,). The choice of m and k can also be selected depending upon the level of protection desired. The matrix 600 in FIG. 6 can be used to generate three FEC packets, with FEC packet 1 protecting source data packets 1, 3 and 4 with $P_1=(1, 3, 4)$, FEC packet 2 protecting source data packets 1, 2 and 5 with $P_2=(1, 2, 5)$ and FEC packet 3 protecting source data packets 2 and 3 with $P_3=(2, 3)$. While aspects and implementations of this disclosure may describe implementations with (k,m) being unchanged, other implementations are possible whereby the value of (k,m) can change over time.

The generator matrix can be characterized by the number of is in each column and row, and corresponding overlap. Let $c_i$ be the number of 1s in each column (column degree) corresponding to the source packet i, and $r_j$ the number of 1s in each row (row degree) corresponding to FEC packet j ($r_j$ is the number of elements contained in the set $S_j$). The overlap between two rows can be denoted as $ov_{jl}$, which can be the number of column entries that have a 1 bit in both row j and row l. In certain implementations, better performance of the FEC code can be obtained with a somewhat sparse (low column/row degree) generator matrix, small amount of overlap between rows, and linearly independent rows. In certain cases, an FEC matrix M can have a set of FEC packets with no overlap ($ov_{jl}=0$ for all row pair), or can have a set of FEC packets with at most 1-level row overlap ($ov_{jl}\leq 1$ for all row pairs).

Referring to FEC generation stage 304, the generation of the FEC code can involve applying the generator matrix on the source packets to generate FEC packets, and can be described using the following equation:

$$F_i = \sum_{j=1}^{k} M_{ij} S_j \qquad \text{[Equation 2]}$$

wherein $F_i$ is a protection packet for i={1, 2, . . . , m}, $S_j$ is a data packet where j={1, 2, . . . k}, and $M_{ij}$ are the elements of the generator matrix M. For simplicity of explanation, with respect to Equation 2, the algebraic sum operation (Σ) is understood to be the XOR operation (e.g., A+B+C=A⊕B⊕c). The XOR operation can be applied over the entire packet data using byte-wise XOR.

Referring to FEC recovery stage 312, an exemplary implementation of FEC recovery is now described.

In one case, the decoder will check if a new received data packet belongs to the packet mask (row of the generator matrix) of any protection packets it has. If so, it can attempt to recover a missing packet. This is only possible if all the packets, except one, are missing from the protection packet packet mask. That is, if the set $P_j$ for protection packet j is missing one element. The missing packet can then be obtained by XORing the other packets in the packet mask.

In another case, the FEC recovery stage can check if any data packets can be recovered with a new received protection packet. Recovery is possible if there is only one missing source packet associated with the received protection packet's packet mask. The missing packet is then obtained by XORing the other packets in the packet mask.

If a new packet is recovered from either of the cases above, then the FEC recovery stage can pass through all received protection packets it has, and check if the newly recovered packet allows for any other packets to be recovered. It can repeat this check until no other packet can be recovered.

If the FEC recovery stage has determined that is has fully recovered all data packets for an encoded frame, then it can ignore newly received protection packets that only protect packets for that frame. The receiver can determine which frames are associated with protection packets via information in the packet header, such as timestamps, sequence numbers, marker bit(s) (e.g., that may indicate a first or a last packet of a video frame), etc.

FIG. 7 is an exemplary extended FEC generator matrix 700 in accordance with an implementation of this disclosure. FIG. 7 depicts an extended generator matrix 700 having a size (5,3). The extended generator matrix 700 explicitly includes the protection packets in the generator matrix unlike the previously described LDGM implementations. The rows of the generator matrix are also referred to below as packet masks for the FEC code (e.g., rows 702*a-c*). Each column of the generator matrix corresponds to one of k source data packets (e.g., columns 704*a-e*) or one of m protection packets (e.g., columns 704*f-h*). Each row 702 of matrix 700 specifies the linear combination of the data and protection packets used to generate a protection packet, where a "1" selects the data or protection packet for protection by the protection packet and a "0" does not select the data packet for protection. The algebraic operation is applied over the data packets by a byte-wise XOR function.

In an implementation, the sequence numbers for the protection packets, for a given group of data packets to be protected by the FEC (the data packets may, in some instances, cover multiple video frames) can follow the sequence numbers of the group of data packets. The packet mask for each protection packet (which can be embedded in the header of each protection packet) can then be defined to extend beyond the data packets to include both data and protection packets. The set of packet masks can then form the extended matrix which can be denoted as $\tilde{M}$. This extended matrix may be written as a concatenation of the (k,m) non-extended generator matrix and a (m,m) sub-matrix: $\tilde{M}=M^{(k,m)}N^{(m,m)}$ (wherein the superscript indicates the matrix size). The set $\tilde{S}_j$ can then be defined as a set of columns having non-zero elements in the sub-matrix $N^{(m,m)}$ for row j.

A constraint can be placed on the extended packet mask so that the set of protection packets may be generated uniquely. In an implementation, the following conditions can be used to guarantee the constraint: the overlap $ov_{jl}$ between any two rows, (j,l), in the sub-matrix $N^{(m,m)}$, is less than or equal to 1, and at least one row of $N^{(m,m)}$ is all zero. Given the two matrices of $\tilde{M}$($M^{(k,m)}$ and $N^{(m,m)}$), the generation of the packet masks can proceed using the following three steps. First, a first set of protection packets $F_i$ can be generated based on the following equation:

$$\tilde{F}_i = \sum_{j=1}^{k} M_{ij}^{(k,m)} S_j \quad \text{[Equation 3]}$$

For example, with respect to FIG. 7, $\tilde{F}_1=S_1+S_3+S_4$, $\tilde{F}_2=S_1+S_2+S_5$, and $\tilde{F}_3=S_2+S_5$. For simplicity of explanation, with respect to Equation 3, the algebraic sum operation (Σ) is understood to be the XOR operation (e.g., A+B+C=A⊕B C). Second, a second set of protection packets can be generated to incorporate protection of protection packets based on the following equation:

$$F_i = \tilde{F}_i + \sum_{j=1}^{m} N_{ij}^{(m,m)} \tilde{F}_j \quad \text{[Equation 4]}$$

wherein values of $F_i$ are computed in an order $\{i_0, i_1, \ldots, i_m\}$ and for each value of $i_j$, the set $\tilde{S}_j$ can only include protection for protection packets of the previously computed rows $\{i_0, i_1, \ldots, i_{j-1}\}$. For simplicity of explanation, with respect to Equation 4, the algebraic sum operation (Σ) is understood to be the XOR operation (e.g., A+B+C=A⊕B⊕C). This constraint can prevent circular reference problems when protection packets are generated in a linear order. For example, with respect to FIG. 7, $F_1=\tilde{F}_2+\tilde{F}_2$, $F_2=\tilde{F}_2+\tilde{F}_3$, and $F_3=\tilde{F}_3$. In this case, the protection packets are computed in an order {3, 2, 1} and the constraint is satisfied because each protection packet is generated using only itself or itself and one or more of the protection packets generated before it.

Third, the generated protection packets $F_i$ (each including its associated extended packet mask) can be transmitted to a receiver along with the data packets $S_j$ (e.g., by protected bitstream transmitter stage 308). The receiver (e.g., FEC recovery stage 312) can then use the extended packet masks to recover lost packets in the same manner as discussed above, except for the difference that data and protection packets may be recovered.

For example, in an implementation, once a receiver receives a source or protection packet, the receiver can check to see if the received packet allows for recovery of a missing data or protection packet. This is possible if only one packet is missing that is associated with one of the extended protection packet masks the receiver has received. The missing packet can then be obtained by XORing the other packets included in that packet mask. If a new data or protection packet is recovered after the above step, then the decoder can review previously received protection packets it has, and can check if the newly recovered data or protection packet allows for any other data or protection packets to be recovered. The receiver can repeat this check for a predetermined number of cycles or until no other data or protection packet can be recovered. If the receiver has determined that it has fully received and/or recovered all data packets from an encoded frame, then it can ignore incoming received protection packets that only protect packets for that frame. The extension of the packet mask to include protection packets can provide additional recovery potential because it allows for recovery of protection packets, which in turn may then help to trigger recovery of other data packets.

The extension of the packet mask is constructed such that the recovery complexity of the protection packets is still low. In other words the receiver can just search for a single missing packet in each received packet mask and apply XOR to recover the missing packet.

One potential drawback with the extended packet mask is upper limits of the packet mask size. The packet mask generally will be defined to be a fixed length, for example 48 bits long as specified in RFC 5109. For RFC 5109 implementations, the limited size means that for a given (k,m) code (again, k=number of source packets and m=number of protection packets), at most 48 source packets can be protected in the case of the non-extended packet mask. Extended packet mask implementations will have the further constraint of including at most n protection packets into the mask such that (k+n)<48. This limitation can become an issue, for example, if the group of data packets k is greater than 24.

As can be understood from the above description, the extended generator matrix and associated extended packet masks can be used to both allow the FEC generator stage 306 to uniquely generate the protection packets and allow the FEC recovery stage 312 to recover lost packets using extended packet masks included in the header of the generated protection packets. The extended packet masks can be implemented as an extension of packet masks defined in RFC 5109 to enable the protection of protection packets. The extended packet masks enables both the transmitter and receiver to make determinations of whether to retransmit protection packets in the event of packet loss (described in additional detail later) and also maintains a simple recovery process by maintaining linearly independent packet masks.

FIG. 8 is an exemplary indirectly extended FEC generator matrix 800 in accordance with an implementation of this disclosure. FIG. 8 depicts an extended generator matrix 800 having a size (5,3). The extended generator matrix 800 implicitly includes the protection packets in the generator matrix by increasing overlap and row-dependence in lieu of increasing the size of the generator matrix. The rows of the generator matrix are also referred to below as packet masks for the FEC code (e.g., rows 802*a-c*). Each column of the generator matrix corresponds to one of k source data packets (e.g., columns 804*a-e*). Each row of the generator matrix can also implicitly include protection for one or more other rows of the generator matrix (e.g. row 802*a* can protect rows 802*b* and 802*c* by incorporating the packet mask for those rows into row 802*a*). Thus, each row 802 of matrix 800 can specify the linear combination of the data and protection packets used to generate a protection packet, where a "1" selects the data or protection packet for protection by the protection packet and a "0" does not select the data packet for protection. The algebraic operation is applied over the data packets by a byte-wise XOR function.

In particular, an implementation of the generation of the indirectly extended generator matrix 800 can include using the steps described in FIG. 7 (e.g., Equations 3 and 4), but with the addition of an addition step as follows:

$$\check{M}_{ij} = M_{ij}^{(k,m)} + \sum_{t=1}^{m} N_{it}^{(m,m)} M_{tj}^{(k,m)} \quad \text{[Equation 5]}$$

wherein values of $\check{M}_{ij}$ are computed in a row order $i\{i_0, i_1, \ldots, i_m\}$ as described above with respect to Equation 4. For simplicity of explanation, with respect to Equation 5, the algebraic sum operation (Σ) is understood to be the XOR operation (e.g., A+B+C=A⊕B⊕C).

This operation can be used to convert the extended set of packet masks (which is made up of $M^{(k,m)}$ and $N^{(m,m)}$ into a non-extended set of packet masks. A potential disadvantage to this approach is that in some cases the resulting generator matrix $\check{M}$ may become dense (higher column or row degree) with some dependency between rows. The loss of the linear independence of the rows can make the decoding process more complex by adding a check for possible dependencies between the rows (packet masks) to determine if a missing packet can be recovered. That is, only looking for a single missing packet for each row/packet mask would not be a sufficient condition for full recovery in all cases. In particular, this could be an issue for large codes (e.g., k>10).

In an implementation using the indirectly extended generator matrix, FEC recovery stage 312 searches for 1-level dependency between rows. In one example, a received protection packet (x) is considered. The protection packet (x) has an associated packet mask that includes at least one data packet that is lost. This mask can be denoted as $\acute{S}_j$. The recovery stage can determine whether any other received FEC packets are exactly equal to the set $\acute{S}_j$ minus one packet. This condition is the 1-level dependency. If a 1-level dependency is found, then the found protection packet, the received protection packet (x), and the set $\acute{S}_j$ can be used to recover a missing data packet. The process can be extended to search for higher level dependencies, for example if some linear combination of received protection packets is equal to $\acute{S}_j$ minus one packet, etc.

Figure 9:
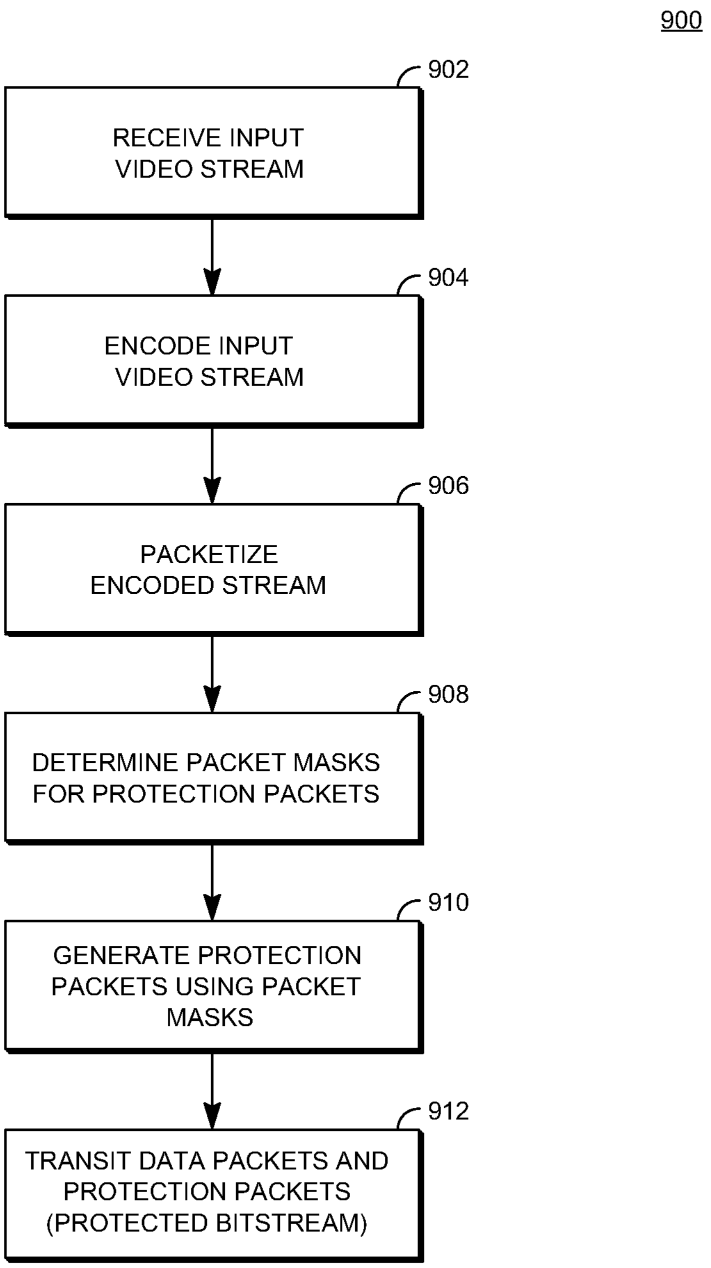
FIG. 9 is a flowchart of a technique for encoding and transmitting video in accordance with an implementation of this disclosure.

FIG. 9 is a flowchart of a technique 900 for encoding and transmitting video in accordance with an implementation of this disclosure. Technique 900 can be implemented using a computing device, such as transmitting station 12 and/or receiving station 16. At stage 902, the input video stream is received. The input video stream can be encoded at stage 904, using encoding techniques such as those described above with respect to encoding stage 302. At stage 904, the encoded video stream is packetized into data packets for transmission over a network. For example, the data packets can be generated using the real-time network protocol (RTP).

At stage 908, packet masks can be determined to generate protection packets for the data packets. The packet masks can be a part of a generator matrix, such as the non-extended, extended, and/or indirectly extended generator matrices and packet masks described above. The packet masks can be determined using, for example, a cost function approach. In an implementation, the packet masks of a generator matrix can be determined using a residual packet loss (RPL) function, a complete recovery rate metric, a variance of residual packet loss, or a combination thereof. These functions and metrics are described with more detail infra.

At stage 910, protection packets are generated using the determined packet masks. The protection packets can be generated using an FEC code, such as an XOR LDGM code as described in RFC 5109. At stage 912, the data packets and protection packets are transmitted across a network. The data packets and protection packets can be transmitted in order or can be interleaved using one or more techniques.

Other implementations of encoding and transmitting video other than the described technique 900 are possible, including those that add, remove, alter, and/or rearrange the stages described above. For example, in an implementation, stages 908 and 910 can be combined into a single FEC generation stage or may alternatively be split into additional stages of FEC generation. In an implementation, stage 912 can be altered or split to include additional functionality of interleaving data and protection packets for transmission.

Various techniques can be used to generate packet masks such as with respect to stage 908 of FIG. 9 and stage 306 of FIG. 3. In an implementation, the packet masks of a generator matrix can be determined using a residual packet loss (RPL) function, a complete recovery rate metric, a variance of residual packet loss, or a combination thereof. For example, a RPL function can be used to estimate the average residual (remaining) loss after FEC recovery using the protection packets. The RPL function can be defined relative to an underlying statistical model of packet loss events. The RPL can be defined for a given FEC code with k data packets and m protection packets as follows:

$$RPL(k, m; P, M) = \sum_C P(C)(l(C) - r(C; M)) \quad \text{[Equation 6]}$$

wherein RPL(k, m; P, M) is the residual packet loss fork data packets and m protection packets based on a probability model P for loss configurations C and a candidate generator matrix (set of packet masks) M, l(C) is a count or number of lost packets for configuration C, and r(C;M) is a count or number of recovered packets for configuration C based on candidate generator matrix M. As an example, recovered and lost packets can include data packets only or can include both data and protection packets An example of a loss configuration, such as for the case of (k+m)=7 packets, can be 1001001, which indicates that packets 2, 3, 5, and 6 are lost and packets 1, 4, and 7 are received. For this example configuration, l(C)=4 and r(C) varies depending on the candidate packet mask.

An equivalent expression of Equation 6 is as follows:

$$\text{RPL}(k,m;P,M)=p-R(k,m;P,M) \quad \text{[Equation 7]}$$

wherein p is the average loss rate ($p=\Sigma_C P(C)l(C)$), which can be measured on the receiver side periodically, and R(k, m; P, M) is the effective recovery rate (ERR) given the FEC code used.

The effective recovery rate (ERR) for a given mask M is a function of one or more channel code parameters and network performance parameters. Channel code parameters can include: number of input/source packets (k); total number of packets including source packets and FEC packets (n) for the FEC code that is being implemented (in this case, an XOR code). Network performance parameters include packet loss rate (p) and burst length measured as the average number of consecutive packets lost (b). Network performance parameters can be obtained periodically, such as approximately once per second, from RTCP reports. Other types of network performance parameters can be used in place of or in addition to packet loss rate (p) and burst length (b).

In one illustrative embodiments, ERR for a candidate mask M in the set {M} of masks is expressed as:

$$ERR = R(p, b, k, n) = \frac{1}{n}\sum_{t=1}^{n} P(t, p, b, n)A(M; t, k, n) \quad \text{[Equation 8]}$$

where P(t,p,b,n) is the probability of losing t packets (from n total packets), given a packet loss rate p and a burst length b, and A(M;t,k,n) is the average number of packets that can be recovered when t packets (from n total packets) are lost. The two basic quantities in the effective recovery rate—A (M;t,k,n) and P(t,p,b,n)—are expressed as follows.

A(M;t,k,n) represents the average number of packets that can be recovered when t packets are lost for a given (k, n) code:

$$A(M;t,k,n)=\sum_{i=1}^{min(t,n-k)} iC(M;i,t,n) \quad \text{[Equation 9]}$$

where C(M; i, t, n) is the ratio as follows:

$$C(M;i,t,n)=\frac{numRecovConfig(M;i,t,n)}{numConfigs(t,n)} \quad \text{[Equation 10]}$$

where the numerator numRecovConfig is the number of configurations where i packets are recovered after losing t packets, from a total of n packets for the given packet mask M in set {M}. The term configurations as used here means the configurations of recovered packets. The denominator numConfigs is the number of possible configurations which could lose t packets from a total of n packets.

P(t,p,b,n) represents the probability of losing t packets, which is determined using a selected packet loss model. A variety of packet loss models can be selected, including random loss models (such as a Bernoulli process), or a bursty loss model (such as a Markov process). Other packet loss models can be used. When a random loss model is used, there may be a higher level of degeneracy in the selected packet mask configuration. In some cases, the dependency of RPL on {p,b} can be ignored to simplify its use.

In practice for larger codes (e.g., k>20), the summation over all possible configurations in Equation 6 can become infeasible. In that case the summation can be understood to be over a large set of (relevant/useful) loss configurations. This set may be predefined or generated randomly based on the underlying loss model P(C).

For improved performance, the RPL in Equation 6 or the ERR in Equation 8 can be computed in advance, off-line, for example by using a look-up table. The look-up table can, for example, reside in memory 26 of transmitting station 12. The table can include rows and columns, where each row can be uniquely identified by an index in a first column. A value of ERR resides in a second column and can be determined as function of (p,b) for each value of (k, n−k). Thus ERR=R(p, b, k, n). Input parameters p and b can be appropriately discretized to have a manageable table size.

An exemplary approach to generating look-up table is to first compute the quantity P(t,p,b,n) for all values of packet loss models parameters (p,b), and for all values of t. A typical range of t would be 0 to n. A typical value for n would be 48. Next, compute the quantity A(t,k,n) for all values of t, given the values of (k, n−k). The value of k can vary from 1 to n/2. Thus a typical value of k would be 24. The difference of (n−k) can vary from 0 to k. The set packet masks are pre-defined and fixed for this exemplary implementation. For example, likely candidate masks can be selected heuristically and then variations can be generated to create a set of masks. Finally, the value of ERR can be tabulated for the set of masks M as function of (p,b) for each value of (k,n−k).

As can be understood from the above, regardless of the techniques used to generate the RPL, since the RPL depends on the candidate matrices, the selection of packet masks $M_s$ may be obtained as a minimization of the RPL over a set of candidate matrices M as follows:

$$M_s=\text{argmin}_M \text{RPL}(k,m;P,M) \quad \text{[Equation 11]}$$

In an implementation, the RPL can be extended to constrain the set of configurations based on a maximum packet loss value and consecutive packet loss value. The maximum packet loss value can indicate a maximum expected number of packets that will need to be recovered. The consecutive packet loss value can indicate a distribution of packet losses (e.g., based on sequence number of each packet). In an implementation, the consecutive packet loss value can be based on re-ordering packets in terms of sequence number and then calculating a maximum gap (minus 1) in sequence numbers between neighboring lost packets. This operation can be denoted S(C). For example, for a loss configuration C=101010 of 6 packets (e.g., 4 data and 2 protection packets) ordered in sequence number order, the value of S(C) is equal to 1. Correspondingly, for a C=100011, S(C)=0, and for a C=011100, S(C)=3. In other words, a small S(C) indicates loss is typically consecutive, whereas a large S(C) indicates that loss is typically non-consecutive.

The maximum packet loss value can be denoted as $l_o$ and the consecutive packet loss value can be denoted as $s_o$. The definition of the RPL metric can be adjusted to incorporate these values as follows:

$$RPL(k,m;P,M;l_o,s_o)=\sum_{C:\{l(C)<l_o,S(C)<s_o\}} P(C)(l(C)-r(C;M)) \quad \text{[Equation 12]}$$

wherein C: $\{l(C)<l_o, S(C)<s_o\}$ indicates that the summation is over configurations C that satisfy the conditions $l(C)<l_o$ and $S(C)<s_o$.

The parameters $l_o$ and $s_o$ can be used to tune the packet mask to certain user application cases. For example, in one case, a receiver may be only concerned with recovering losses up to some size ($l_o$), since beyond that size another mechanism for recovery (i.e., resending key frame) may be used. Regarding the parameter $s_o$, the sequence number ordering of the packets is often the transmission order itself (i.e., the packets are sent out in order of sequence number), so if one knows there is little packet re-ordering during the transmission path, then tuning the packet mask to provide better recovery for a small $s_o$ could be desirable. On the other hand, if one expects significant packet reordering (say the server reshuffles the packets, or the packets themselves take very different paths to arrive at their destination), then one may set $s_o$ to be a larger number (e.g., $s_o$=k+m), so it becomes less influential in the calculation of the RPL. In an implementation, the maximum loss parameter may be associated with the burst value (e.g., $l_o$=b). In an implementation, $s_o$ may be selected to be a fixed number.

Accordingly, the adjusted RPL metric shown in Equation 12 can be utilized to select extended packet masks to be used for FEC generation and recovery. In particular, the extended packet masks $\tilde{M}_S$ can be selected by finding minimum values of the RPL over a set of candidate extended packet masks M ($\text{argmin}_M$) as follows:

$$\tilde{M}_s=\text{argmin}_M \text{RPL}(k,m;P,M;l_o,s_o) \quad \text{[Equation 13]}$$

The candidate set of packet masks M can be a predetermined fixed set, a set generated stochastically in the minimization function (e.g., using gradient descent), or can be determined using some other technique.

While the extended packet masks can be selected using Equation 13 alone, an implementation can instead or additionally select the packet masks using a multi-stage technique. For example, the selection of the packet masks can begin with the pre-selection of a non-extended generator matrix $M_s^{(k,m)}$. The selection can, for example, be made using Equation 11. Next, an initial extended generator matrix $\tilde{M}$ can be constructed by concatenating the non-extended generator matrix $M_s^{(k,m)}$ with an empty matrix $N^{(m,m)}$.

Next, the extended generator matrix can be selected by minimizing the extended generator matrix M (e.g. by using Equation 13 above) by iterating through possible combinations of values for $N^{(m,m)}$ while keeping the pre-selected values of $M_s^{(k,m)}$ constant and while maintaining the constraints of the $N^{(m,m)}$ sub-matrix consistent with those described with respect to Equation 4 above. The above steps can be repeated (e.g., with a different pre-selected set of values for $M_s^{(k,m)}$ until the calculated RPL falls below a specified threshold.

The RPL computations discussed above may be computed off-line, for a range of different values of (k,m), for different probability loss models, (p,b), and for different parameters ($l_o$, $s_o$). In a real-time implementation, the FEC generator can select a set of packet masks from a look-up table, based on, for example, the current encoding and network state. The current encoding state and network state can dictate the values of (k,m) and the parameters (p,b), ($l_o$,$s_o$).

In addition to the RPL metric, other metrics can be suitable for the selection of extended packet masks for, as an example, the application of real-time video conferencing. In particular, these other metrics can be used in an implementation where the receiver may NACK missing packets after FEC recovery. These other metrics can be used in addition to or instead of the RPL metrics described above. Furthermore, the sender may switch between the different metrics for the selection of the packet mask based on various metrics, which can include, for example, current network conditions.

In an implementation, a complete recovery metric can be used. Generally, this metric is more suitable for the case where the receiver will only decode complete frames (e.g., no missing packets and decoding without errors). In this case, the receiver will wait for packet re-transmissions before decoding a frame (e.g., until the missing packets are recovered and/or received). Therefore, packet loss not recovered by the FEC will be NACKed (re-transmitted), which will incur some delay and/or freezing in decoding and/or rendering the received video. The NACKing (i.e., request for retransmission) can be done once the receiver believes it cannot recover any more packets from a given frame. This means that the delay/freeze penalty the receiver suffers will likely be similar regardless of whether one or multiple packets cannot be recovered for a given frame (since the delay cost generally and largely results from the roundtrip-time (RTT), which will be incurred whether one or multiple packets are retransmitted).

For such an implementation, the complete recovery rate (CRR) function can be used to determine the FEC packet masks, such as follows:

$$CRR(k, m, b; P, M) = \sum_{C:\{l(C)<l_o, S(C)<s_o\}} P(C)\delta_{l(C)-r(C;M)} \quad \text{[Equation 14]}$$

wherein $\delta_x$=1 if x=0 and $\delta_x$=0 otherwise.

The CRR metric measures the fraction of loss configurations, up to loss amount $l_o$, where complete recovery can be achieved using FEC recovery. Complete recovery means no NACKing, so this measure is designed to gauge the amount of freezing/delay for a network whose actual loss never exceeds $l_o$. For example, values of CRR close to 1 would mean small number of delays/freezes (e.g., most losses being recovered using FEC) for losses smaller than $l_o$.

An estimate of $l_o$ may be obtained, for example, from measurements on the receiver side, and/or prior knowledge/expectation of network behavior. The sender may then use these estimates to select the extended packets masks having a larger CRR for the value of $l_o$. The trade-off will generally be a lower CRR for configurations with losses larger than $l_o$ (e.g., larger freezes/delays in the even that losses are greater than expected).

In an implementation, a variance of residual packet loss metric can be used. The variance of residual loss $\sigma_{RPL}$ can be defined as follows:

$$\sigma_{RPL}(k, m; P, M) = \sum_{C:\{l(C)<l_o, S(C)<s_o\}} P(C)(l(C) - r(C; M)) * (l(C) - r(C; M)) - RPL * RPL \quad \text{[Equation 15]}$$

The variance of residual loss can measure the spread of the residual loss across loss configurations. As an example, a particular case may have 10 equally weighted configurations where each configuration has 5 losses. Then, assuming a constant RPL (e.g., RPL=1), a zero value of $\sigma_{RPL}$ indicates that 4 packets can be recovered from each of the 10 configurations. A high value of $\sigma_{RPL}$ could conversely indicate, for example, that all 5 losses could be recovered in 8 configurations, but no losses could be recovered from 2 configurations.

The variance of residual loss metric can be used in cases where the receiver is configured to decode incomplete frames (e.g., frames with missing packets). In such a scenario, even if all the missing packets cannot be recovered using FEC, the receiver may not wait for NACK/re-transmission. Having a lower variance of residual loss may be preferable in this case since some loss may be tolerated by the decoder (using for example, error concealment), whereas a big loss will likely have a larger adverse impact on the decoder. A lower value of $\sigma_{RPL}$ therefore may have a significant positive impact on the video quality in the presence of packet loss.

For the case where the receiver decodes only complete frames (decodes without errors), then a higher value of $\sigma_{RPL}$ may be preferable, since effectively this would mean less NACKing overall and hence less freezing. A higher $\sigma_{RPL}$ means that there are only a few loss configurations where the FEC cannot recover anything (and hence a NACK is transmitted), but for the remaining (majority) of the loss configurations there is perfect recovery (so no NACK). The sender can determine whether the receiver is decoding with/without errors, and based on that determination, the FEC generator may select the extended FEC packets masks based on the variance of the residual loss and/or complete recovery rate in addition to or instead of using RPL or other available metrics or cost functions.

Figure 10:
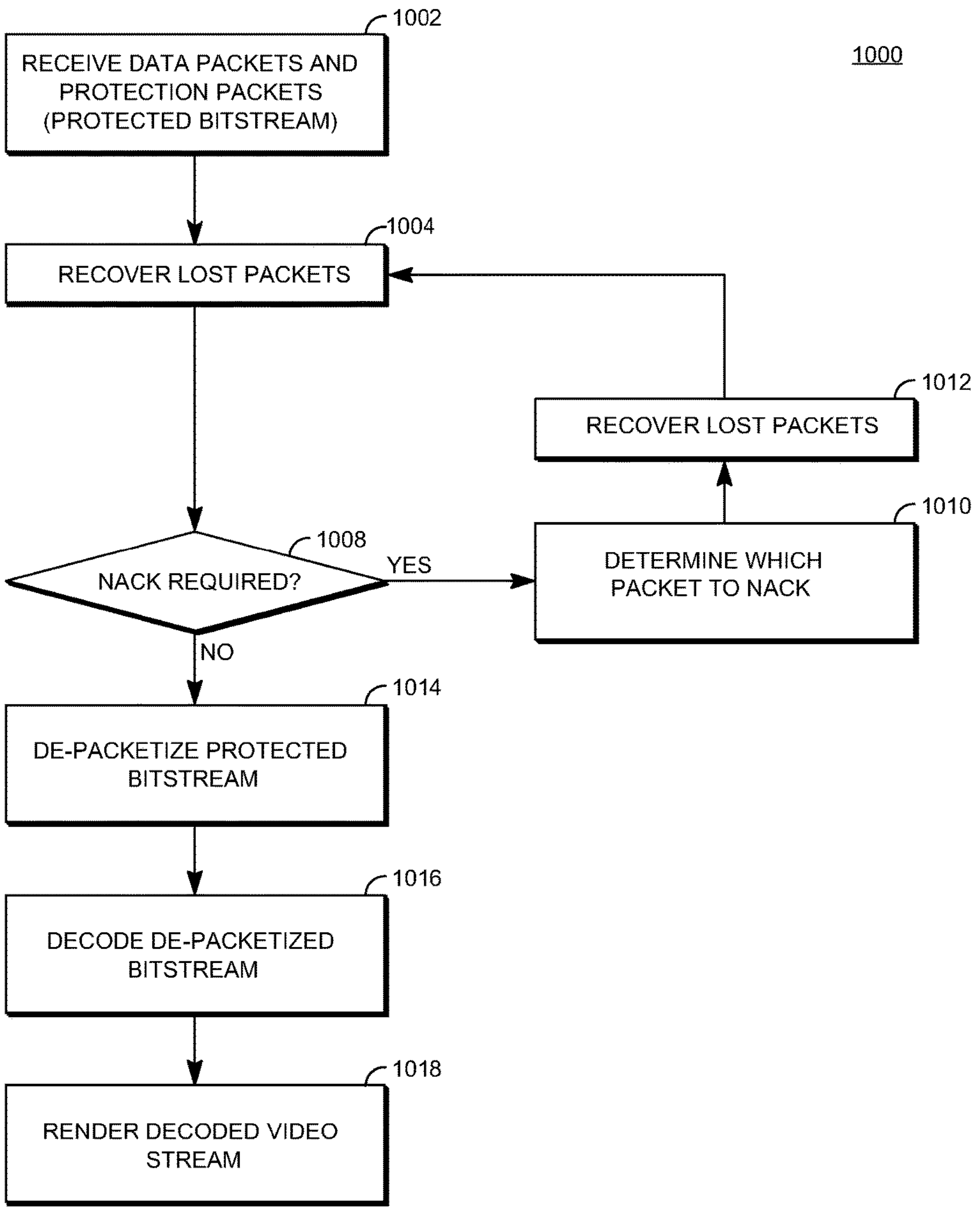
FIG. 10 is a flowchart of a technique for receiving and decoding video in accordance with an implementation of this disclosure.

FIG. 10 is a flowchart of a technique 1000 for receiving and decoding video in accordance with an implementation of this disclosure. Technique 1000 can be implemented using a computing device, such as transmitting station 12 and/or receiving station 16. At stage 1002, data packets and protection packets that include an encoded video stream are received from a network. At stage 1004, a determination is made as to whether any packets are lost for a particular unit of the encoded video stream (e.g., a frame). The determination can be made, for example, based on a threshold of elapsed time after which all data packets were expected to be received. If all data packets have been received (but one or more protection packets have been received), a determination can be made that no packets are lost in some instances (e.g., when the lost protection packets cannot be used to recover packets for any other unit of the encoded video stream.

If the determination indicates that there are lost packets, packets can then be recovered by stage 1004. Packets can be recovered using FEC techniques, such as those described with respect to FIG. 3 and stage 312 above. The techniques can include using extended packet masks and/or indirectly extended packet masks embedded in received protection packets to recover lost protection packets. Accordingly, stage 1004 can include multiple iterations of recovery, whereby checks are made to determine whether newly recovered packets can be utilized to recover additional lost packets.

Once all possible packets have been recovered (within the constraints of the implementation utilized), control passes to stage 1008, where a determination is made whether a NACK is required. Multiple factors can be employed to make this determination. Most simply, a determination can be made as to whether there are any remaining missing packets (i.e. any lost packets that could not be recovered using FEC). This determination can be limited, in some instances, to whether there are any missing data packets. In an implementation, a determination can be made as to whether the receiver is configured to render the video stream with or without errors. For example, the video stream can be configured to tolerate a certain threshold of missing data (e.g., based on an error concealment capability of the video decoder) and thus, a certain number of missing packets may not be enough to generate a NACK. However, if the decoder is configured to decode without errors, any missing packets can be enough to generate a NACK. Other determinations can also be used to determine whether a NACK is required.

If a NACK is required based on the determinations of stage 1008, control passes to stage 1010, where a determination is made as to which packets to NACK. In some implementations, all missing packets can always be NACKed. In some implementations, a determination can be made whether to NACK packets based on the extended packet masks embedded into the received protection packets and a determination as to whether certain missing packets can trigger recovery of other missing packets. For example, if packet A can trigger recovery of packet B, it may be advantageous to only request retransmission of packet A or to request two retransmissions of packet A (to protect against potential packet loss) instead of requesting retransmission of both packet A and packet B. Once the determination is made, the NACK (retransmission) requests can be sent to the network.

At stage 1012, the lost packets that were NACKed are received. Depending on packet loss of the retransmission and the packets selected for retransmission, all or some of the NACKed packets may be received and some packets may still need to be recovered. Accordingly, control passes back to stage 1004, where a determination is made as to whether there are lost packets based on the newly received packets. At stage 1004, if there is a determination made that there are no lost packets (or none that need to be recovered), control passes to stage 1014. Control also passes to stage 1014 from stage 1008 if a determination is made that no NACK (retransmission) is required for any missing packets (or if there are no missing packets) at that stage.

At stage 1014, the received data packets are de-packetized to form a de-packetized bitstream that is an encoded video bitstream (with the exception of any errors, such as those that might be introduced by missing packets). Next, at stage 1016, the de-packetized bitstream (the encoded video bitstream) is decoded, using, for example, techniques such as those described with respect to FIG. 3 and stage 316 above. Once or as the video stream is decoded, it can then be rendered at stage 1018, for example, to a display device and/or a storage device.

Other implementations of receiving and decoding video in addition to the description of technique 1000 are possible, including those that add, remove, alter, and/or rearrange the stages described above. For example, in an implementation, stage 1010 can be omitted and/or a stage can be added that transmits NACK packets (which can include always transmitting an indication of all missing packets). In an implementation, NACKing can be omitted in view of FEC recovery and stages 1008, 1010, and 1012 can be omitted.

Figure 11:
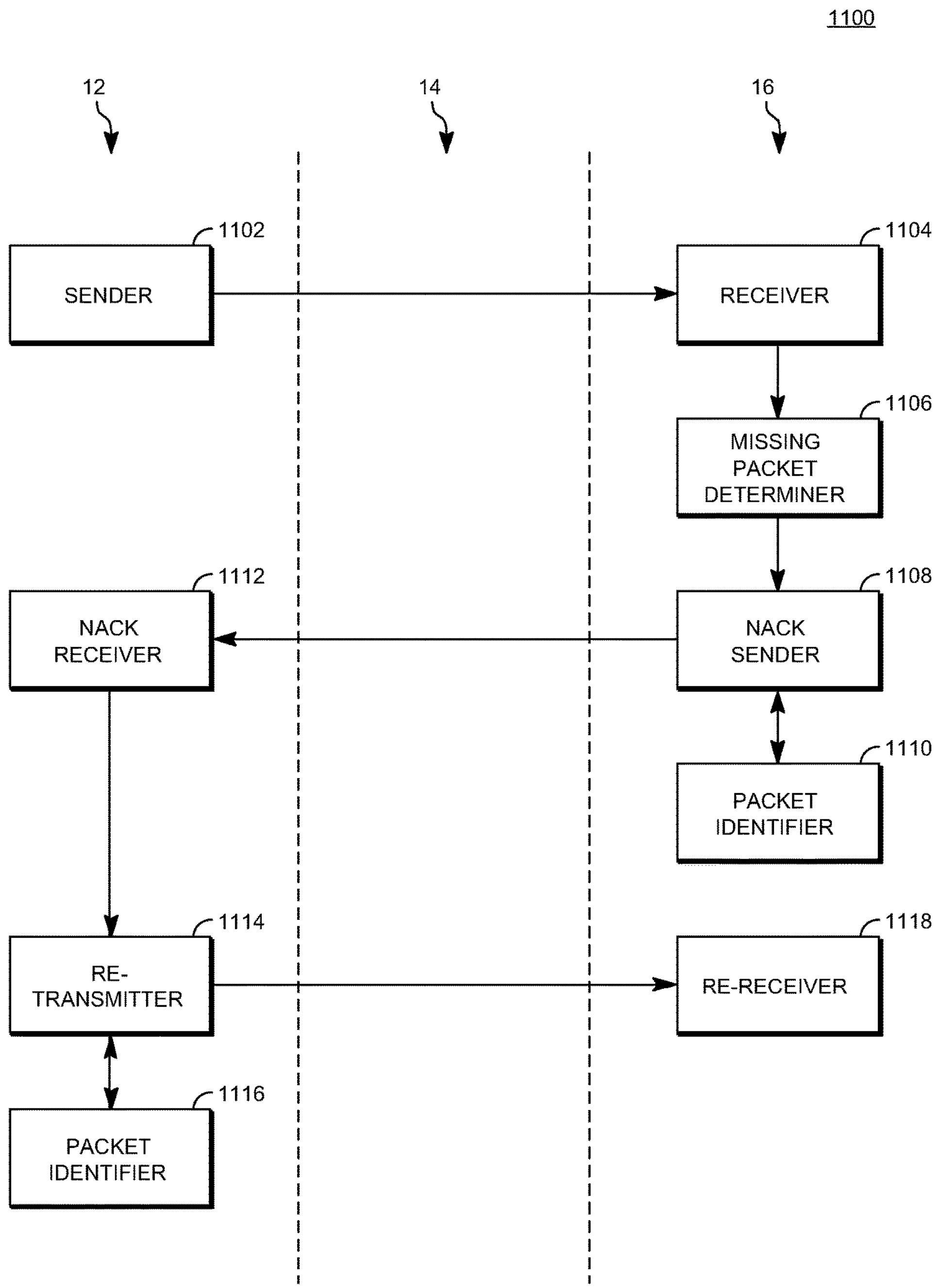
FIG. 11 is a block diagram of a technique for retransmitting lost packets in accordance with an implementation of this disclosure.

FIG. 11 is a block diagram of a technique 1100 for retransmitting lost packets in accordance with an implementation of this disclosure. Technique 1100 can be implemented using transmitting station 12, network 14, and receiving station 16 as shown. Beginning at stage 1102, a sender can transmit a protected bitstream (e.g., data packets and protection packets) to network 14. The sender stage 1102 can generate the protected bitstream using any one of a number of techniques including those described above with respect to FIG. 3 and FIG. 10.

At stage 1104, a receiver can receive the protected bitstream from sender stage 1102. The receiver can, for example, recover packets using FEC recovery and use techniques of receiving and recovering packets such as those described above with respect to FIG. 3 and FIG. 10. At missing packet determiner stage 1106, a determination can be med as to whether there are any missing packets that need to be recovered. As described above with respect to FIG. 3 and FIG. 10, certain missing/lost packets need not be recovered, such as protection packets in the event that all data packets are received/recovered or even data packets in the instance that the decoder of the receiver is configured to allow for decoding with errors.

At NACK sender stage 1108, NACK requests are sent for retransmission of missing packets. NACK sender stage 1108 can utilize packet identifier stage 1110 to determine which missing packets should be requested for retransmission. For example, all missing packets can be requested for retransmission. In another example, packet identifier stage 1110 can utilize the extended or implicitly extended packet masks of received protection packets to determine which packets would be most advantageous for retransmission.

At NACK receiver stage 1112, NACK requests are received from NACK sender stage 1108. NACK requests can be forwarded to re-transmitter stage 1114 where retransmissions of lost data and protection packets can be executed. Re-transmitter stage 1114 can include using packet identifier 1116 in conjunction with received NACK requests to determine which packets should be re-transmitted. In one case, the NACK requests may specifically identify which packets to re-transmit and thus stage 1116 could not be used.

However, in another case, the NACK requests could include all packets that the receiver is missing. In this case, packet identifier 1116 can be used to determine which packets should be resent in light of the packet masks of the protection packets (e.g., if most/all protection packets are missing, if the receiver does not have packet identification capability, and/or if the packet masks are indirectly extended). The determination can include identifying whether certain packets could enable the recovery of other packets if retransmitted.

At re-receiver stage 1118, the re-transmitted packets are received and can be used to recover other packets and or to de-packetize and then decode the encoded bitstream.

Other implementations of re-transmitting video in addition to the description of technique 1100 are possible, including those that add, remove, alter, and/or rearrange the stages described above. For example, in an implementation, one of stages 1110 or 1116 can be omitted. In an implementation, re-receiver 1118 can be incorporated into receiver 1104.

In accordance with the above description it is understood that a use case of extended protection packets includes the re-transmission of packets in a hybrid NACK/FEC implementation. For example, in a general hybrid NACK/FEC technique, a receiver will request for re-transmission of data packet(s) when it cannot recover the data packet(s) from the FEC decoding. However, in some cases it can be more useful to re-transmit a protection packet instead of a missing data packet. This decision can be based on the structure of the extended packet masks. The determination for substituting a protection packet for a data packet for re-transmission can be performed on the receiver, sender side, or both (e.g., stages 1110 and 1116).

For example, in a sender-side implementation, the sender can first receive a request for re-transmission of a data packet (x) from the receiver. The sender can then identify protection packets that have this data packet (x) in their packet masks. Based on the structure of the extended packet masks, the sender may decide to send a protection packet instead of the requested data packet.

In an implementation, the re-transmission technique can proceed as follows. Consider the protection packets that have data packet (x) in their packet mask. Of these protection packets, select the one that (1) has the lowest row degree and (2) is also used in the $N^{(m,m)}$ sub-matrix for protection of other packets. Send this identified protection packet instead of data packet (x). Thus, the sender can decide to send the protection packet (instead of packet (x)) if it can find a protection packet that is highly dedicated to the source packet (condition (1), low row degree), and also useful for recovery other packets (condition (2)).

In an implementation, the receiver may directly request re-transmission of a protection packet (x). The receiver can first identify a missing protection packet (x). If the missing protection packet is found among the one or more protection packets already received, then the receiver can request re-transmission of the missing protection packet (x). The identified missing protection packet (x) can be considered useful/important and thus be re-transmitted because the protection packet (x) is contained in the packet masks of other protection packets and can thus trigger recovery of other packets. In an implementation, a combination of the sender and receiver side determinations based on the extended packet mask can also be utilized.

FIG. 12 is an exemplary extended FEC generator matrix 1200 used to illustrate the recovery of data packets based on the recovery of a single protection packet. Generator matrix 1200 can be used to illustrate various cases where retransmission of a protection packet can be more advantageous than retransmitting a data packet when extended packet masks are employed.

For example, in one case, a sender receives a NACK list from a receiver requesting retransmission of packets $S_3$, $S_4$, and $F_4$. This means a receiver has detected that packets $S_3$, $S_4$, and $F_4$ are lost. In a typical implementation, the sender would re-transmit the 2 data packets (i.e., the missing data packets $S_3$, $S_4$). However, in an implementation contemplated by this disclosure, if the sender looks at an extended generator matrix (e.g., packet masks) for the lost and received packets, it may decide to send instead $S_3$ and $F_4$. The reason for this it that $F_4$ could be more useful then $S_4$, for example in the case that one of the re-transmitted packets is lost, the protection packet may trigger more recovery. So for the same amount of NACK overhead (same number of re-transmitted packets), it may be more efficient to send $F_4$ instead of $S_4$.

The two cases can be compared as follows. There are 4 types of loss events for the 2 re-transmitted packets. The sender can assume that the other packets ($S_1$, $S_2$, $F_1$, $F_2$, $F_3$) have been received at the receiver (since they did not appear on the NACK list).

The first case of re-transmitting $S_3$ and $S_4$ can have one of the following outcomes:

a) $S_3$ arrives, $S_4$ arrives: no recovery needed since both packets arrive.

b) $S_3$ lost, $S_4$ lost: recovery is needed, but not possible; both data packets still lost.

c) $S_3$ lost, $S_4$ arrives: $S_3$ cannot be recovered ($F_4$ not available for recovery); one data packet is still lost.

d) $S_3$ arrives, $S_4$ lost: $S_4$ can be recovered ($F_4$ can be recovered using $F_3$, $S_2$, $S_3$ and $S_4$ can then be recovered using $F_4$, $S_3$); both packets received/recovered.

The second case of re-transmitting $S_3$ and $F_4$ can have one of the following outcomes:

a) $S_3$ arrives, $F_4$ arrives: $S_4$ can be recovered ($S_4$ can be recovered using $F_4$, $S_3$); both packets received/recovered.

b) $S_3$ lost, $F_4$ lost: recovery is needed, but not possible; both data packets still lost.

e) $S_3$ lost, $F_4$ arrives: $S_3$ can be recovered ($S_3$ can be recovered using $F_3$, $F_4$, $S_2$ and $S_4$ can then be recovered using $F_4$, $S_3$); both packets received/recovered.

f) $S_3$ arrives, $F_4$ lost: $S_4$ can be recovered ($F_4$ can be recovered using $F_3$, $S_2$, $S_3$ and $S_4$ can then be recovered using $F_4$, $S_3$); both packets received/recovered.

Thus, the first and second cases show that the transmission of a protection packet in lieu of a data packet can result in a more robust re-transmission. As shown above, the re-transmission fails 50% of non-weighted outcomes in the first case of transmitting both data packets but only fails 25% of non-weighted outcomes in the second case of transmitting a data packet and a protection packet. An advantage of the second case (for this particular loss scenario and generator matrix) is that the receiver can always recover from one packet lost in re-transmission.

The implementations of encoding and decoding described above illustrate some exemplary encoding and decoding techniques. However, it is to be understood that encoding and decoding, as those terms are used in the claims, could mean compression, decompression, transformation, or any other processing or change of data.

The use of the "plus" operator (+) and "summation" operator (Σ) with respect to Equations 2-5 herein (e.g., for the generation of protection packets) is used to refer to an XOR operation (⊕) (e.g., A+B+C=A⊕B⊕C). The XOR operation is an exclusive or operation (logical disjunction) that returns a "0" when both operands are the same value (e.g., both "0" or both "1") and returns a "1" when the operands are different (e.g. one "1" and one "0"). Other uses of the "plus" operator (+) and "summation" operator (Σ) herein refers to their typical usage with respect to an arithmetic sum operation.

The words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The embodiments of stations 12 and 16, whether in the form of video transmission implementation 300 or other implementations disclosed herein (and the algorithms, methods, instructions etc. stored thereon and/or executed thereby), can be realized in hardware, software, or any combination thereof. The hardware can include, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of stations 12,16 do not necessarily have to be implemented in the same manner.

Further, in an implementation, stations 12,16 can be implemented using a general purpose computer/processor with a computer program that, when executed, carries out any of the respective methods, algorithms and/or instructions described herein. In addition or alternatively, for example, a special purpose computer/processor can be utilized which can contain customized hardware for carrying out any of the methods, algorithms, or instructions described herein.

Video transmission implementation 300 can, for example, be implemented on computers in a screencasting system. In an implementation, station 12 can be a server and station 16 can be a device separate from the server, such as a hand-held communications device (i.e. a cell phone).

Further, all or a portion of embodiments of the present disclosure can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic, magnetic, optical, electromagnetic or a semiconductor device. Other suitable mediums are also available. As an example, techniques 900, 1000 can take the form of computer program products that are accessible from memory 26 of one or more stations 12, 16.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for transmitting a video stream over a network with forward error correction protection, the video stream including a plurality of frames, the method comprising:

encoding a current frame of the plurality of frames;

producing a plurality of data packets from the encoded frame;

generating a plurality of protection packets including data usable for restoring one or more lost data packets of the plurality of data packets, wherein at least one of the plurality of protection packets also includes data usable for restoring a lost protection packet of the plurality of protection packets, and wherein a protection packet of the plurality of protection packets includes a packet mask that indicates which of the plurality of protection packets are protected by the protection packet; and transmitting the data packets and the protection packets over the network.

2. The method of claim 1, wherein the packet mask includes a plurality of bits, wherein each of the plurality of data packets and each of the plurality of protection packets are directly associated with a single bit of the plurality of bits.

3. The method of claim 1, wherein the packet mask includes a plurality of bits, wherein each of the plurality of data packets are directly associated with a single bit of the plurality of bits and wherein a protected protection packet of the plurality of protection packets is indirectly incorporated into the plurality of bits using a packet mask of the protected protection packet.

4. The method of claim 1, wherein the protection packet is generated using a linear combination of packets specified by the packet mask.

5. The method of claim 4, wherein the linear combination is generated using a byte-wise XOR.

6. The method of claim 4, further comprising:

receiving a retransmission request from the network; and retransmitting a lost protection packet of the plurality of protection packets.

7. The method of claim 6, wherein the retransmission request includes a list of lost packets, the method further comprising:

determining that the lost protection packet should be retransmitted based on a determination that the lost protection packet can be utilized to recover at least one other lost packet included in the list of lost packets.

8. The method of claim 1, wherein the video stream is transmitted to a receiving station that is configured to only decode frames having no missing packets and generating the plurality of protection packets includes generating packet masks for the protection packets based on a complete recovery rate metric.

9. The method of claim 8, wherein the complete recovery metric CRR is generated based on the equation:

$$CRR(k, m, b; P, M) = \sum_{C:\{l(C)<l_o, S(C)<s_o\}} P(C)\delta_{l(C)-r(C;M)}$$

wherein k is a number of data packets and m is a number of protection packets for a generator matrix based on a probability model P for loss configurations C and a candidate generator matrix M, S(C) is a function determining a consecutiveness of packet loss, l(C) is a count of lost packets for configuration C, r(C;M) is a count of recovered packets for configuration C based on candidate generator matrix M, $l_o$ is a maximum packet loss value, $s_o$ is a consecutive packet loss value, and $\delta_x=1$ if x=0 and $\delta_x=0$ otherwise.

10. The method of claim 1, wherein the video stream is transmitted to a receiving station that is configured to allow frames having missing packets to be decoded and generating the plurality of protection packets includes generating packet masks for the protection packets based on a variance of a residual packet loss metric.

11. The method of claim 10, wherein the variance of a residual packet loss metric $\sigma_{RPL}$ is generated based on the equation:

$$\sigma_{RPL}(k, m; P, M) = \sum_{C:\{l(C)<l_o, S(C)<s_o\}} P(C)(l(C) - r(C;M)) * (l(C) - r(C;M)) - RPL * RPL$$

wherein RPL is the average residual packet loss for k data packets and m protection packets based on a probability model P for loss configurations C and a candidate generator matrix M, l(C) is a count of lost packets for configuration C, S(C) is a function determining a consecutiveness of packet loss, r(C;M) is a count of recovered packets for configuration C based on candidate generator matrix M, $l_o$ is a maximum packet loss value, and $s_o$ is a consecutive packet loss value.

12. The method of claim 1, wherein the video stream is transmitted to a receiving station that is configured to only decode frames having no missing packets and generating the plurality of protection packets includes generating packet masks for the protection packets based on an increase of a variance of a residual packet loss metric.

13. The method of claim 1, wherein generating the plurality of protection packets includes generating a packet mask for a protection packet of the plurality of protection packets based on a minimum of residual packet loss determined using inputs of a maximum packet loss value and a consecutive packet loss value, wherein the maximum packet loss value indicates a maximum expected number of packets that will be recovered using forward error correction, and wherein the consecutive packet loss value indicates an expected distribution of packet losses relative to an ordering of the data and protection packets.

14. The method of claim 13, wherein the packet mask is included in a generator matrix ($M_s$) that is generated based on the equation:

$$M_s = \text{argmin}_M RPL(k, m; P, M; l_o, s_o) = \text{argmin}_M \sum_{C:\{l(C)<l_o, S(C)<s_o\}} P(C)(l(C) - r(C;M))$$

wherein RPL(k,m; P, M) is the average residual packet loss fork data packets and m protection packets based on a probability model P for loss configurations C and a candidate generator matrix M, S(C) is a function determining a consecutiveness of packet loss, l(C) is a count of lost packets for configuration C, and r(C;M) is a count of recovered packets for configuration C based on candidate generator matrix M, $l_o$ is the maximum packet loss value, and $s_o$ is the consecutive packet loss value.

15. A method for receiving a video stream from a network, the video stream including a plurality of frames, the method comprising:

receiving a plurality of data packets and protection packets from the network, wherein the data packets include portions of an encoded unit of the video stream, and wherein a protection packet of the plurality of protection packets includes a packet mask that indicates which of the plurality of protection packets are protected by the protection packet;

determining that a lost data packet of the encoded unit has not been received from the network;

determining that a lost protection packet associated with the encoded unit has not been received from the network;

recovering the lost protection packet; and recovering the lost data packet using the recovered lost protection packet.

16. The method of claim 15, wherein recovering the lost protection packet includes (a) identifying a protection packet of the plurality of received protection packets having the lost protection packet included in its packet mask and (b) recovering the protection packet by performing byte-wise XOR operations on other packets included in the packet mask of the identified protection packet.

17. The method of claim 15, wherein recovering the lost protection packet or the lost data packet includes searching for a dependency between the packet mask of a first received protection packet of the plurality of received protection packets that includes the lost packet and a linear combination of other received protection packets of the plurality of protection packets.

18. The method of claim 15, wherein recovering the lost protection packet includes:

determining that the lost protection packet cannot be recovered using any of the received plurality of protection packets;

determining that the lost protection packet should be retransmitted instead of the lost data packet;

transmitting a retransmission request to the network requesting retransmission of the lost protection packet; and receiving the lost protection packet from the network.

19. The method of claim 18, wherein the lost data packet is a first lost data packet, the method further comprising:

recovering a second lost data packet using the recovered first lost data packet and a protection packet of the received protection packets having a packet mask that includes the first lost data packets and the second lost data packet.

20. The method of claim 19, wherein the packet mask is a bit array that includes bits respectively associated with each packet of the plurality of data packets, plurality of protection packets, and lost packets, wherein each bit indicates whether its respective packet is protected by the protection packet associated with the packet mask.

21. An apparatus for transmitting a video stream over a network with forward error correction protection, the video stream including a plurality of frames, comprising:

a memory; and a processor configured to execute instructions stored in the memory to:

encode a current frame of the plurality of frames, produce a plurality of data packets from the encoded frame, generate a plurality of protection packets including data usable for restoring one or more lost data packets of the plurality of data packets, wherein at least one of the plurality of protection packets also includes data usable for restoring a lost protection packet of the plurality of protection packets, and wherein a protection packet of the plurality of protection packets includes a packet mask that indicates which of the plurality of protection packets are protected by the protection packet, and transmit the data packets and the protection packets over the network.

22. The apparatus of claim 21, wherein the packet mask includes a plurality of bits, wherein each of the plurality of data packets and each of the plurality of protection packets are directly associated with a single bit of the plurality of bits.

* * * * *